(12) United States Patent
Mauldin et al.

(10) Patent No.: US 11,136,877 B2
(45) Date of Patent: *Oct. 5, 2021

(54) CONTROL FOR ROTARY STEERABLE SYSTEM

(71) Applicant: Weatherford Technology Holdings, LLC, Houston, TX (US)

(72) Inventors: Charles L. Mauldin, Spring, TX (US);
Richard E. Berns, Conroe, TX (US);
Daniel Sullivan, Gloucestershire (GB);
Liam A. Lines, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,771

(22) Filed: Aug. 6, 2019

(65) Prior Publication Data

US 2020/0072033 A1   Mar. 5, 2020

Related U.S. Application Data

(63) Continuation of application No. 15/282,379, filed on Sep. 30, 2016, now Pat. No. 10,415,363.

(51) Int. Cl.
*E21B 7/06* (2006.01)
*E21B 47/022* (2012.01)
(Continued)

(52) U.S. Cl.
CPC ............ *E21B 44/00* (2013.01); *E21B 7/06* (2013.01); *E21B 7/067* (2013.01); *E21B 47/022* (2013.01); *E21B 47/12* (2013.01); *G01D 5/14* (2013.01)

(58) Field of Classification Search
CPC ........ E21B 47/022; E21B 47/024; E21B 7/04; E21B 44/00; E21B 7/06
See application file for complete search history.

(56) References Cited

U.S. PATENT DOCUMENTS 4,416,339 A    11/1983  Baker et al.
5,685,379 A *  11/1997  Barr .................. E21B 7/068
                                              175/61
(Continued)

FOREIGN PATENT DOCUMENTS

EP    1008717 A1    6/2000
GB    2486811 A     6/2012
(Continued)

OTHER PUBLICATIONS

Schlumberger, "PowerDrive X6," Brochure, copyright 2010, 6-pgs.
(Continued)

*Primary Examiner* — Catherine Loikith
(74) *Attorney, Agent, or Firm* — Blank Rome LLP

(57) ABSTRACT

Angular position readings are obtained during rotation of an apparatus in a borehole, and angular rate readings are obtained over time of the rotation. The angular rate readings are adjusted based at least on the angular position readings. The angular position measurement does not require calibrated magnetometers or accelerometers to function. Additionally, a dynamic scale factor calculation for an angular rate gyroscope (ARG) allows the ARG to be used over a much wider operating range than without such a calculation. Finally, an integrated angular rate from the ARG calibrated for bias and scale factor fills in positional information between the magnetometers' zero crossings to deliver a high resolution hybrid angular position system capable of measuring precise angular position at high and irregular downhole rotation rates.

20 Claims, 7 Drawing Sheets

(51) Int. Cl.
  *E21B 47/024* (2006.01)
  *E21B 7/04* (2006.01)
  *E21B 44/00* (2006.01)
  *E21B 47/12* (2012.01)
  *G01D 5/14* (2006.01)

(56) References Cited

U.S. PATENT DOCUMENTS

| | | | |
|---|---|---|---|
| 5,706,905 | A | 1/1998 | Barr |
| 6,092,610 | A | 7/2000 | Kosmala et al. |
| 6,109,370 | A | 8/2000 | Gray |
| 6,116,354 | A | 9/2000 | Buytaert |
| 6,158,529 | A | 12/2000 | Dorel |
| 6,290,003 | B1 | 9/2001 | Russell |
| 6,315,062 | B1 | 11/2001 | Alft et al. |
| 6,470,974 | B1 | 10/2002 | Moore et al. |
| 6,837,315 | B2 | 1/2005 | Pisoni et al. |
| 6,840,336 | B2 | 1/2005 | Schaaf et al. |
| 6,913,095 | B2 | 7/2005 | Krueger |
| 7,004,263 | B2 | 2/2006 | Moriarity et al. |
| 7,360,610 | B2 | 4/2008 | Hall et al. |
| 7,510,027 | B2 | 3/2009 | Weston et al. |
| 7,510,029 | B2 | 3/2009 | Gunsaulis et al. |
| 7,766,098 | B2 | 8/2010 | Farley |
| 8,255,163 | B2 | 8/2012 | Mauldin et al. |
| 8,528,636 | B2 | 9/2013 | Brooks |
| 8,781,746 | B2 | 7/2014 | Schneider et al. |
| 8,827,006 | B2 | 9/2014 | Moriarty |
| 9,347,279 | B2 | 5/2016 | Crowley et al. |
| 9,366,131 | B2 | 6/2016 | Mauldin et al. |
| 9,567,844 | B2 | 2/2017 | Mauldin et al. |
| 10,100,630 | B2 | 10/2018 | Bartel et al. |
| 10,641,077 | B2 * | 5/2020 | Sullivan ............... E21B 47/022 |
| 2004/0016571 | A1 | 1/2004 | Krueger |
| 2004/0222023 | A1 | 11/2004 | Haci et al. |
| 2006/0243487 | A1 | 11/2006 | Turner et al. |
| 2006/0249287 | A1 | 11/2006 | Downton et al. |
| 2009/0222209 | A1 | 9/2009 | Morys |
| 2009/0260884 | A1 | 10/2009 | Santelmann |
| 2010/0163308 | A1 | 7/2010 | Farley et al. |
| 2011/0066392 | A1 | 3/2011 | Judd |
| 2011/0266063 | A1 | 11/2011 | Downton |
| 2012/0018225 | A1 | 1/2012 | Peter et al. |
| 2012/0160563 | A1 | 6/2012 | Clark et al. |
| 2012/0160565 | A1 | 6/2012 | Downton et al. |
| 2013/0092439 | A1 | 4/2013 | Mauldin et al. |
| 2014/0163888 | A1 | 6/2014 | Bowler et al. |
| 2014/0262507 | A1 | 9/2014 | Marson et al. |
| 2015/0337601 | A1 | 11/2015 | Niina et al. |
| 2016/0002978 | A1 | 1/2016 | Rushton |
| 2016/0090789 | A1 | 3/2016 | Gajji et al. |
| 2018/0252088 | A1 | 9/2018 | Tilley et al. |

FOREIGN PATENT DOCUMENTS

| | | |
|---|---|---|
| WO | 2012/012624 A1 | 1/2012 |
| WO | 2014/196958 A1 | 12/2014 |
| WO | 2015/127345 A2 | 8/2015 |

OTHER PUBLICATIONS

Weatherford, "Revelotion(R) Rotary-Steerable System," Brochure, copyright 2015, 12-pgs.
Int'l Search Report and Written Opinion in counterpart PCT Appl. PCT/US2017/046883, dated Dec. 5, 2017, 14-pgs.
PCT Search Report and Written Opinion in PCT Appl. No. PCT/US2018/019376; dated May 15, 2018; 12 Pages.
Int'l Search Report and Written Opinion in PCT Appl. PCT/US2017/046856, dated Nov. 20, 2017, 11-pgs.
First office action in copending U.S. Appl. No. 15/282,242, dated May 3, 2018.
First office action in copending U.S. Appl. No. 15/452,229, dated Sep. 21, 2018.
Final office action in copending U.S. Appl. No. 15/282,242, dated Nov. 9, 2018.

* cited by examiner

CONTROL FOR ROTARY STEERABLE SYSTEM

CROSS-REFERENCE TO RELATED APPLICATIONS

This is a continuation of U.S. application Ser. No. 15/282,379 filed 30 Sep. 2016, which was filed concurrently with U.S. application Ser. No. 15/282,242 entitled "Rotary Steerable System Having Multiple Independent Actuators," both of which are incorporated herein by reference in its entirety.

FIELD OF THE DISCLOSURE

The subject matter of the present disclosure relates to an apparatus and method for controlling a downhole assembly. The subject matter is likely to find its greatest utility in controlling a steering mechanism of a downhole assembly to steer a drill bit in a chosen direction, and most of the following description will relate to steering applications. It will be understood, however, that the disclosed subject matter may be used to control other parts of a downhole assembly.

BACKGROUND OF THE DISCLOSURE

When drilling for oil and gas, it is desirable to maintain maximum control over the drilling operation, even when the drilling operation may be several kilometers below the surface. Steerable drill bits can be used for directional drilling and are often used when drilling complex borehole trajectories that require accurate control of the path of the drill bit during the drilling operation.

Directional drilling is complicated because the steerable drill bit must operate in harsh borehole conditions. The steering mechanism is typically disposed near the drill bit, and the desired real-time directional control of the steering mechanism is remotely controlled from the surface. Regardless of its depth within the borehole, the steering mechanism must maintain the desired path and direction and must also maintain practical drilling speeds. Finally, the steering mechanism must reliably operate under exceptional heat, pressure, and vibration conditions that will typically be encountered during the drilling operation.

Many types of steering mechanism are used in the industry. A common type of steering mechanism has a motor disposed in a housing with a longitudinal axis that is offset or displaced from the axis of the borehole. The motor can be of a variety of types including electric and hydraulic. Hydraulic motors that operate using the circulating drilling fluid are commonly known as a "mud" motors.

The laterally offset motor housing, commonly referred to as a bent housing or "bent sub", provides lateral displacement that can be used to change the trajectory of the borehole. By rotating the drill bit with the motor and simultaneously rotating the motor housing with the drillstring, the orientation of the housing offset continuously changes, and the path of the advancing borehole is maintained substantially parallel to the axis of the drillstring. By only rotating the drill bit with the motor without rotating the drillstring, the path of the borehole is deviated from the axis of the non-rotating drillstring in the direction of the offset on the bent housing.

Another steering mechanism is a rotary steerable tool that allows the drill bit to be moved in any chosen direction. In this way, the direction (and degree) of curvature of the borehole can be determined during the drilling operation, and can be chosen based on the measured drilling conditions at a particular borehole depth. Rotary steerable tools can be configured as point-the-bit or push-the-bit to steer drilling.

Typically, the rotary steerable tool uses a reference to the tool's position while drilling so the rotary steerable tool can steer the advancing borehole in the correct direction. Because the rotary steerable tool rotates in the advancing borehole and experiences a number of disturbances in the process, the rotational speed of the tool can vary significantly over the course of several and even a single rotation. For example, Stick-Slip is one type of variation that can occur in the rotational speed of the steering apparatus. Stick-Slip can produce inaccuracies that cause significant difficulties in controlling the trajectory of the borehole. Therefore, accurate sensing capabilities of the rotary steerable tool in high resolution is beneficial to system performance, allowing the rotary steerable tool to better compensate for downhole dynamics.

Although several rotary steerable tools available in the industry may be effective, they may still suffer from inaccurate operation due to the dynamic conditions that can occur downhole while advancing a borehole.

SUMMARY OF THE DISCLOSURE

According to the present disclosure, a method is used in drilling a borehole with an apparatus having at least one actuator for steering. The borehole is advanced by imparting rotation to the apparatus. Angular rate readings of the rotation are obtained, and angular position readings of the apparatus are obtained during the rotation.

The angular rate readings are adjusted based at least on the angular position readings to determine angular positions of the apparatus. Actuations of the at least one actuator is determined for steering the apparatus toward a target toolface relative to the determined angular positions. The apparatus can then be deviated in the advancing borehole in response to the determined actuations of the at least one actuator.

According to the present disclosure, an apparatus is imparted with rotation for drilling a borehole. The apparatus comprises at least one actuator, a sensing element, and a control system. The at least one actuator is actuatable to steer the apparatus in advancing the borehole. During the rotation of the apparatus, the sensing element obtains angular position readings and obtains angular rate readings of the rotation.

The control system is in operable communication with the at least one actuator and the sensing element. Using the obtained readings to control the apparatus, the control system adjusts the angular rate readings based at least on the angular position readings to determine angular positions of the apparatus, determines actuations of the at least one actuator for steering the apparatus toward a target direction relative to the determined angular positions, and deviates the apparatus in advancing the borehole in response to the determined actuations of the at least one actuator.

The disclosed method and apparatus of the present disclosure may be directed to a push-the-bit configuration of steering. In push-the-bit, the drilling direction of the drill bit in a desired direction is changed by pushing against the side of the borehole in an opposing direction. Comparable components and techniques disclosed herein can be used in the other type of steering configuration of point-the-bit. In the point-the-bit configuration, the drilling direction of the bit in a desired direction is changed by pushing an internal drive shaft having the drill bit in the desired direction. As such, the components and techniques disclosed herein with respect to the push-the-bit system can apply equally well to a point-the-bit system through a reversal of pushing components from external (push) to internal (point).

In the disclosed method and apparatus, toolface offset readings of the apparatus in the borehole can be obtained at least periodically when not rotating. The angular position readings of the apparatus can then be corrected relative to the at least periodically obtained toolface offset readings. Further, the angular rate readings can be adjusted based at least on the angular position readings corrected relative to the at least periodically obtained toolface offset readings.

To at least periodically obtain the toolface offset readings of the apparatus in the borehole when not rotating, a determination can be made that the apparatus is not rotating. A magnetic toolface (e.g., using X-Y magnetometer readings) and a highside toolface (e.g., using accelerometer readings) are obtained of the apparatus when not rotating, and the toolface offset is calculated from the determined magnetic toolface and highside tool face. This calculated toolface offset can be adjusted by at least one dynamic parameter based on information of inclination and azimuth of the apparatus.

To obtain the angular position readings of the apparatus during the rotation, a calculation is made for each of one or more states of the angular position readings in two orthogonal axes to find a resolved angular orientation corrected by a toolface offset. For example, the calculations can detect zero-crossings for X-Y directions of the angular position readings at four of the states in each of the X-Y directions. In turn, the angular rate readings accumulated over time can be adjusted by the resolved angular orientations.

Calibrations can be performed for the sensor readings. In general, at least drilling parameter downhole (e.g., temperature, mud flow rate, mud weight, etc.) can be measured so that the angular position readings and/or the angular rate readings can be adjusted based on the measurement. Bias of the angular rate readings can be measured at least periodically when the apparatus is not rotating in the borehole, and the angular rate readings obtained during the rotation can be adjusted by the at least periodically measured bias. The angular rate readings can also be calibrated for temperature effects based on a scale factor determined dynamically from the obtained angular position readings. Further, the angular position readings obtained during the rotation can be calibrated based on at least one of: sensor bias, scale of first of the readings with respect to a first axis relative to second of the readings with respect to a second axis, and a misalignment of the first and second axes relative the apparatus.

For the steering, the actuations of the at least one actuator determined during the rotation can involve determine a first angular orientation to start the actuation and a second angular orientation to stop the actuation for each of the at least one actuator. The actuations of the at least one actuator can be monitored so that adjustments to the actuations can be made in response to the monitoring.

Although suited for steering during directional drilling, teachings of the present disclosure can be used in other implementations, such as in measurement-while-drilling (MWD) or logging-while-drilling (LWD) implementations. For instance, the teachings of the present disclosure can be used when measuring/logging with at least one sensor on an apparatus in a borehole. In this technique, the at least one sensor advances in the borehole while rotation is imparted to the apparatus so that the at least one sensor senses measurements while rotation is imparted to the apparatus advancing in the borehole. Angular rate readings are obtained of the rotation of the apparatus, and angular position readings are obtained of the apparatus during the rotation. The technique adjusts the angular rate readings based at least on the angular position readings to determine angular positions of the apparatus.

In this way, one or more the measurements of the at least one sensor sensing during the rotation can be correlated to the determined angular positions. In turn, an image can be generated from the one or more correlated measurements. The results can give high resolution angular position measurements that can improve the quality of log images, wellbore surveys, and the like. Also, the correlation can allow for targeted sensing by the at least one sensor. For instance, the one or more measurements sensed with the at least one sensor at one or more sensed directions during the rotation can be correlated to one or more target directions of the determined angular positions. The result is that the at least one sensor can sense towards (or be correlated to) one or more target directions based on the determined angular positions.

Briefly, there are a number of benefits of the teachings of the present disclosure. In one benefit, the angular position measurement does not require "calibrated sensors," such as magnetometers or accelerometers. A "calibrated sensor" typically means that, during tool production and subsequent testing activities, the tool's sensor is subjected to a series of mechanical orientations at various temperatures during which data is collected. This raw data is then post-processed to generate a formal set of calibration coefficients, which are then typically loaded into the tool's memory so that they are directly available to the sensor compensation algorithms that execute during tool deployment. One advantage of the techniques in the present disclosure is that the techniques potentially eliminate the requirement to characterize the sensor using these traditional methods. Instead, the present techniques dynamically generate sensor calibration coefficients in the form of 'bias' and 'scale factor' corrections during deployment.

As an additional benefit, a dynamic scale factor calculation for an angular rate gyroscope (ARG) allows the gyroscope to be used over a much wider operating range than without such a calculation. Finally, an integrated angular rate from the gyroscope calibrated for bias and scale factor fills in positional information between magnetometers' zero crossings to deliver a high resolution hybrid angular position system, which is capable of measuring precise angular position at high and irregular downhole rotation rates. These and other benefits will be evident from the present disclosure.

The foregoing summary is not intended to summarize each potential embodiment or every aspect of the present disclosure.

DETAILED DESCRIPTION OF THE DISCLOSURE

Figure 1:
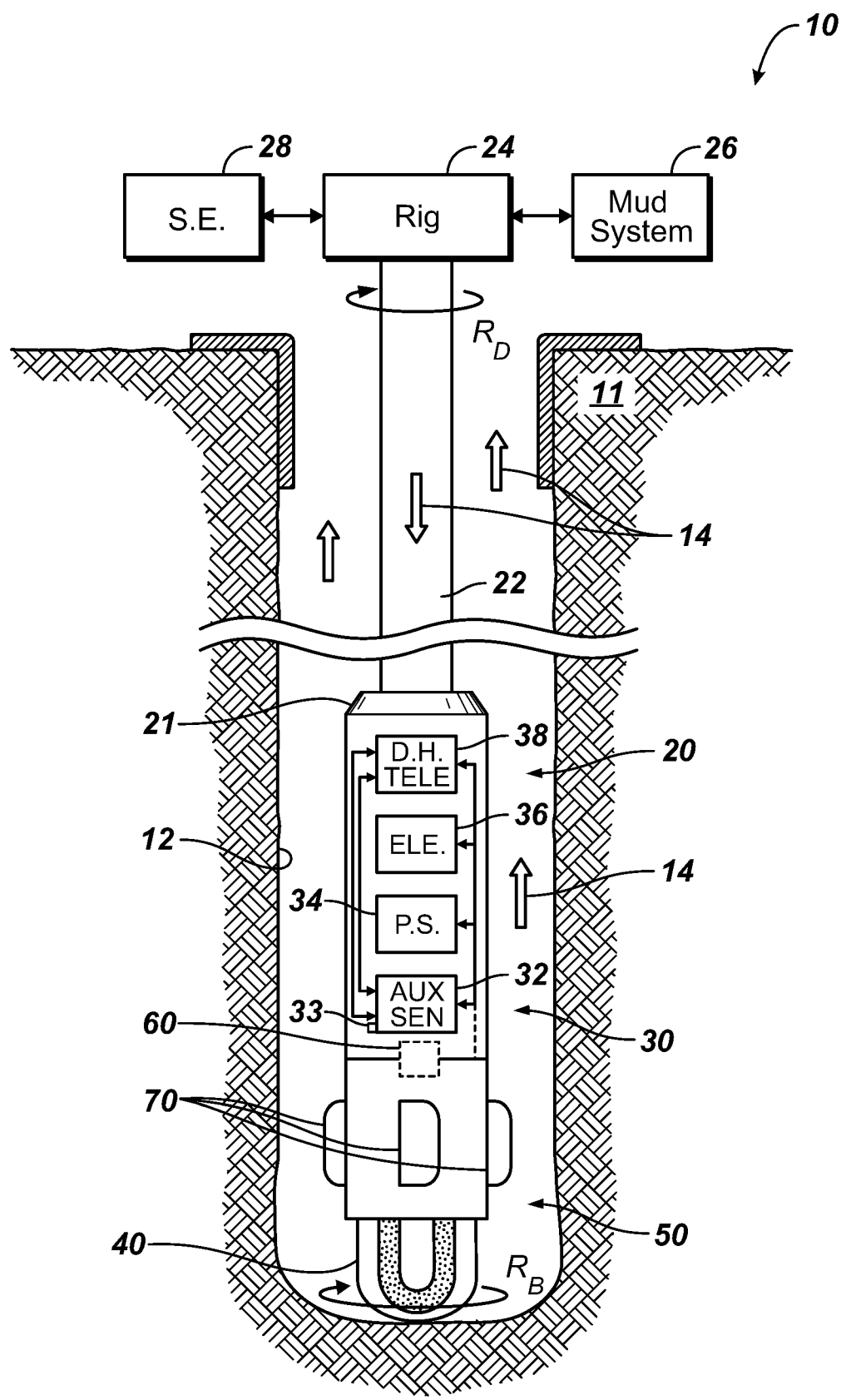
FIG. 1 schematically illustrates a downhole assembly incorporating a steering apparatus according to the present disclosure.

FIG. 1 schematically illustrates a drilling system 10 incorporating a rotating steering apparatus 50 according to the present disclosure. As shown, a downhole drilling assembly 20 drills a borehole 12 penetrating an earth formation 11. The assembly 20 is operationally connected to a drillstring 22 using a suitable connector 21. In turn, the drillstring 22 is operationally connected to a rotary drilling rig 24 or other known type of surface drive.

The downhole assembly 20 includes a control assembly 30 having a sensor section 32, a power supply section 34, an electronics section 36, and a downhole telemetry section 38. The sensor section 32 has various sensing elements, such as directional sensors, accelerometers, magnetometers, and inclinometers, which can be used to indicate the orientation, movement, and other parameters of the downhole assembly 20 within the borehole 12. This information, in turn, can be used to define the borehole's trajectory for steering purposes. The sensor section 32 can also have any other type of sensors used in Measurement-While-Drilling (MWD) and Logging-While-Drilling (LWD) operations including, but not limited to, sensors responsive to gamma radiation, neutron radiation, and electromagnetic fields.

The electronics section 36 has electronic circuitry to operate and control other elements within the downhole assembly 20. For example, the electronics section 46 has downhole processor(s) (not shown) and downhole memory (not shown). The memory can store directional drilling parameters, measurements made with the sensor section 32, and directional drilling operating systems. The downhole processor(s) can process the measurement data and telemetry data for the various purposes disclosed herein.

Elements within the downhole assembly 20 communicate with surface equipment 28 using the downhole telemetry section 38. Components of this telemetry section 38 receive and transmit data to an uphole telemetry unit (not shown) within the surface equipment 28. Various types of borehole telemetry systems can be used, including mud pulse systems, mud siren systems, electromagnetic systems, angular velocity encoding, and acoustic systems.

The power supply section 34 supplies electrical power necessary to operate the other elements within the assembly 20. The power is typically supplied by batteries, but the batteries can be supplemented by power extracted from the drilling fluid by way of a power turbine, for example.

During operation, a drill bit 40 is rotated, as conceptually illustrated by the arrow RB. The rotation of the drill bit 40 is imparted by rotation RD of the drillstring 22 at the rotary rig 24. The speed (RPM) of the drillstring rotation RD is typically controlled from the surface using the surface equipment 28. Additional rotation to the drill bit 40 can also be imparted by a drilling motor (not shown) on the drilling assembly 20.

During operation, the drilling fluid system or pumps 26 pumps drilling fluid or "mud" from the surface downward and through the drillstring 22 to the downhole assembly 20. The mud exits through the drill bit 40 and returns to the surface via the borehole annulus. Circulation is illustrated conceptually by the arrows 14.

The steering apparatus 50 rotates with the drill string 22 in imparting rotation to the drill bit 40. To directionally drill the advancing borehole 12 with the downhole assembly 20, a control system or controller 60 operates, actuates, activates, etc. one or more directional devices 70a-c on the apparatus 50. Preferably, multiple devices 70a-c can be operated independently on the apparatus 50, and the control system 60 can operate the devices 70a-c individually using hydraulic, mechanical, and other configurations. For the hydraulic configuration, the control system 60 changes delivery of a portion of the flow of the fluid (circulated drilling mud) to actuate the devices 70a-c, and the control system 60 in the mechanical configuration changes physical engagement to actuate the devices 70a-c. The independent operation of the multiple directional devices 70a-c alters the direction of the steering apparatus 50 as it advances the borehole 12. To direct the trajectory of the advancing borehole 12, the control system 60 uses orientation information measured by the sensor section 32 cooperating with control information stored in the downhole memory of the electronics section 36.

The independent extension/retraction of the directional devices 70a-c can be coordinated with the orientation of the drilling assembly 20 in the advancing borehole 12 to control the trajectory of drilling. In the end, the extension/retraction of the directional devices 70a-c disproportionately engages the drill bit 40 against a certain side in the advancing borehole 12 for directional drilling. (Reference to disproportionate engagement at least means that the engagement in advancing the borehole 12 is periodic, varied, repetitive, selective, modulated, changing over time, etc.)

Given the above description of the drilling system 10, discussion now turns to embodiments of the drilling assembly 20 having the steering apparatus 50 to achieve directional drilling.

Figure 2:
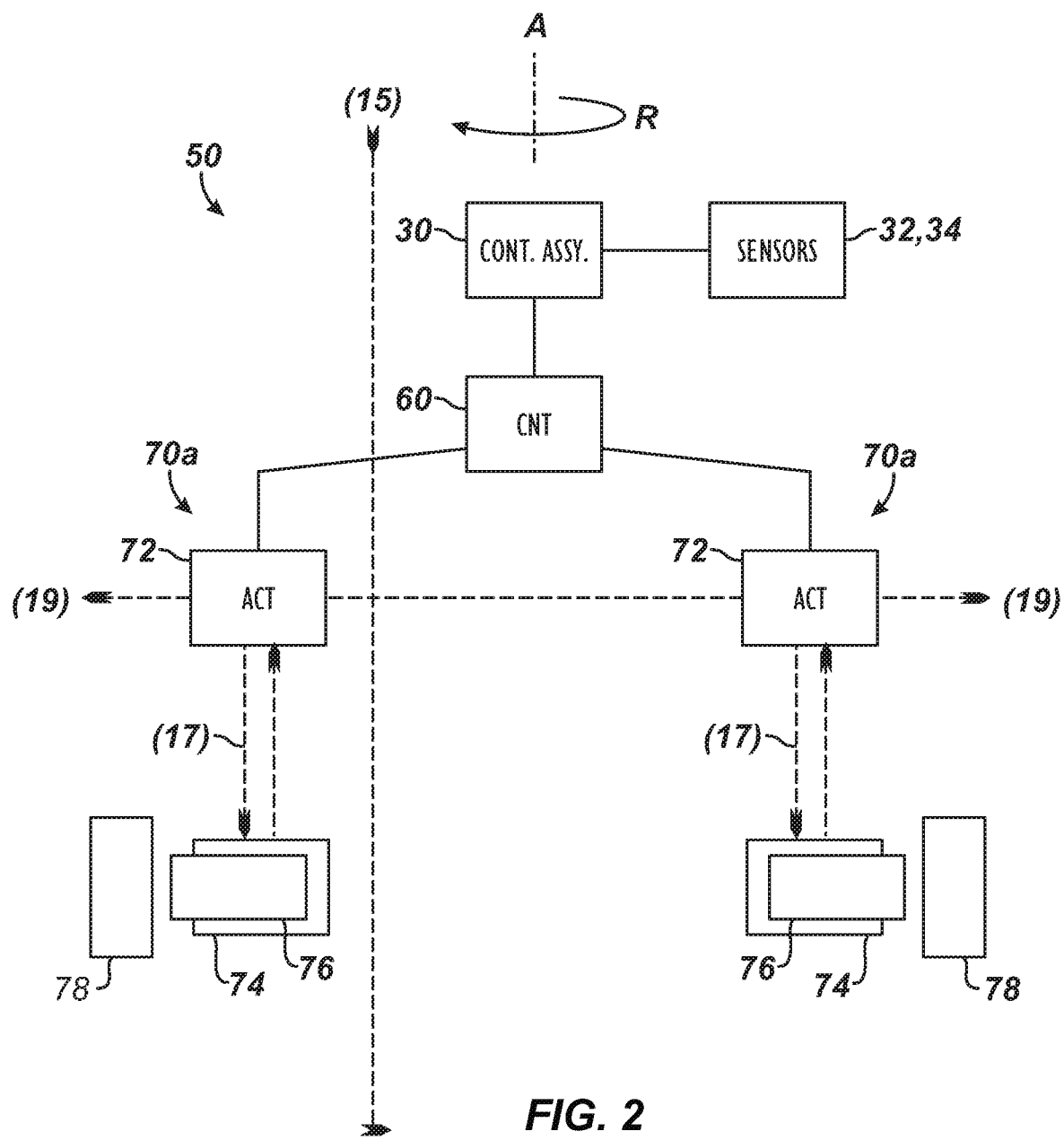
FIG. 2 schematically illustrates a configuration of a steering apparatus according to the present disclosure.

A hydraulic configuration of the steering apparatus 50 is schematically shown in more detail in FIG. 2. The controller 60 connects to the control assembly 30 having the sensor section 32, the power source 34, etc. The controller 60 also connects to each of the one or more directional devices or directors 70. (Two directional devices 70a-b are schematically shown here for illustrative purposes: the apparatus 50 can have more or less as desired.) Each directional device 70a-b includes an actuator 72 and a movable element 76 disposed on the apparatus 50 to rotate therewith. Each device 70a-c is independently operable to move its movable element 76 between an extended condition and a retracted condition relative to the apparatus 50.

Various devices can be used for the actuator 72, such as hydraulic valves, electric motors, solenoids, and the like. Likewise, various devices can be used for the movable element 76, such as pistons, pads, arms, and the like. In one particular arrangement, for example, the actuators 72 include hydraulic components to direct a portion of bore flow (15) (passing through the apparatus 50 from the drill string (22) to the drill bit (40)) to piston chambers 74 having pistons as the movable elements 76. Diverted flow (17) from the actuators 72 can activate these pistons as the movable elements 76 in the piston chambers 74 to move pads 78 to engage the borehole as the apparatus rotates. Expelled fluid (19) from the piston chambers 74 by the actuators 72 can then allow the pads 78 to retract from the borehole as the apparatus 50 rotates. As will be appreciated, other actuators 72 and moveable elements 76 can be used to achieve similar actuations and can rely on hydraulics, mechanical engagement, electric power, or other motive source.

By independently operating the multiple directional devices 70a-b, the steering apparatus 50 steers the assembly (20) using active deflection as the apparatus 50 rotates with the drill string (22). Therefore, the steering apparatus 50 of FIG. 2 operates to steer drilling during rotation R about the apparatus' axis A. This rotation R of the apparatus 50 can average 300-rpm or more. Each actuator 72 can be operated to extend its piston as the movable elements 76 at the same target position, synchronous to the apparatus' rotation R. Meanwhile, the rotary position of the apparatus 50 is determined by the sensor section 32 and the like of the control system 30 (discussed in more detail later).

Figure 3B:
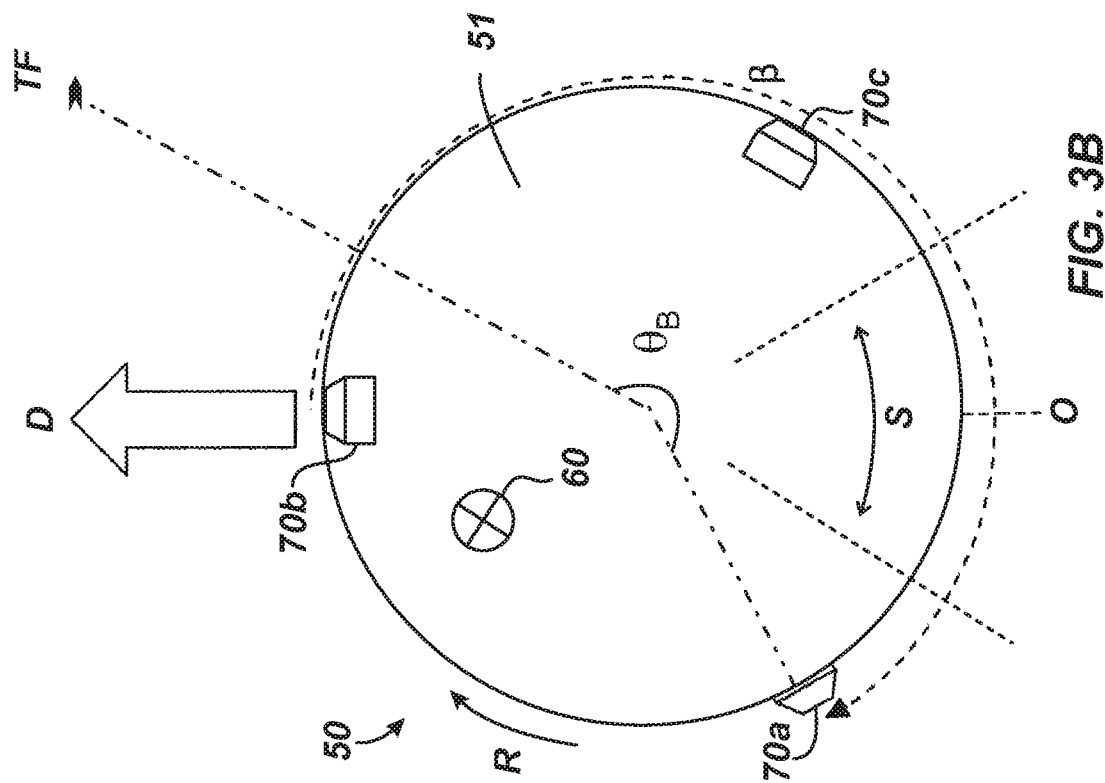
FIGS. 3A-3B schematically illustrate end views of the steering apparatus during operation.
Figure 3A:
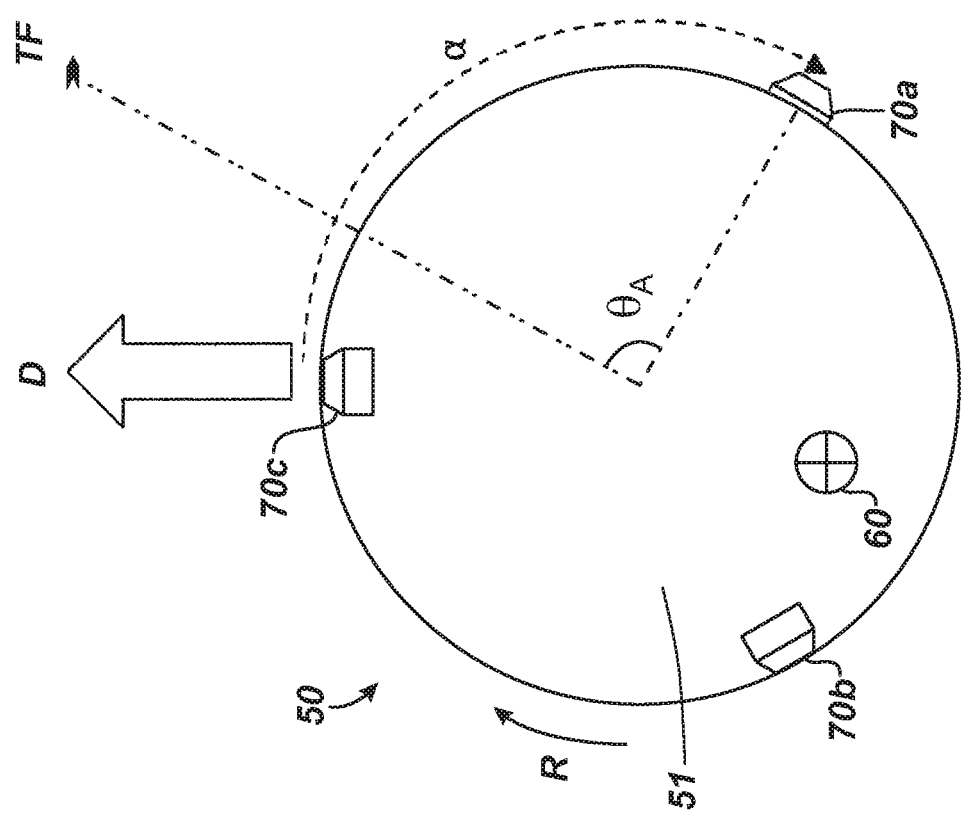

Having an understanding of the steering apparatus 50, discussion now turns to its operation. FIGS. 3A-3B schematically illustrate end views of the steering apparatus 50 during operation in two states of operation. As noted herein, the steering apparatus 50 has one or more directional devices 70a-c disposed around the apparatus' housing 51, such as the three directional devices 70a-c depicted here. As also noted herein, the apparatus 50 is capable of controlling multiple actuators (not shown) independently to extend the directional devices 70a-c as they rotate with the housing 51.

As expressed herein, the housing 51 having the directional devices 70a-c rotates with the drillstring (22), and the housing 51 imparts rotation to the drill bit (40). As these components rotate, the transverse displacement of the directional devices 70a-c can then displace the longitudinal axis of the housing 51 relative to the advancing borehole. This, in turn, tends to change the trajectory of the advancing borehole. To do this, the independent extensions/retractions of the directional devices 70a-c are timed relative to a desired direction D to deviate the apparatus 50 during drilling. In this way, the apparatus 50 operates to push the drill bit (40) to change the drilling trajectory.

FIGS. 3A-3B show one of the movable directional devices 70a extended therefrom during a first rotary orientation (FIG. 3A) and then during a later rotary orientation (FIG. 3B) after the housing 51 has rotated. Because the steering apparatus 50 is rotated along with the drillstring (22), the operation of the steering apparatus 50 is cyclical to substantially match the period of rotation of the drillstring (22).

As the steering apparatus 50 rotates, for instance, the orientation of the directional devices 70a-c is determined by the control system (60), position sensors, toolface (TF), etc. When it is desired to deviate the drill bit (40) in the desired direction D, then it is necessary to extend one or more of the directional devices 70a-c as they face toward the opposite direction O. The control system (60) calculates the orientation of the diametrically opposed position O and instructs the actuators for the directional devices 70a-c to operate accordingly. Specifically, the control system (60) may produce the actuation so that one directional device 70a extends at a first angular orientation (a in FIG. 3A) relative to the desired direction D and then retracts at a second angular orientation (β in FIG. 3B) in the rotation R of the steering apparatus 50.

Because the directional device 70a is rotating in direction R with the housing 51, orientation of the directional device 70a relative to a reference point is determined using the toolface (TF) of the housing 51. This thereby corresponds to the directional device 70a being actuated to extend starting at a first angular orientation $\theta_A$ relative to the toolface (TF) and to retract at a second angular orientation $\theta_B$ relative to the toolface (TF). The toolface (TF) of the housing 51 can be determined by the control system (60) using the sensors and techniques discussed below.

Because the directional device 70a does not move instantaneously to its extended condition, it may be necessary that the active deflection functions before the directional device 70a reaches the opposite position O and that the active deflection remains active for a proportion of each rotation R. Thus, the directional device 70a can be extended during a segment or width S of the rotation R best suited for the directional device 70a to extend and retract relative to the housing 51 and engage the borehole to deflect the housing 51. The RPM of the housing's rotation R, the drilling direction D relative to the toolface (TF), the operating metrics of the directional device 70a, and other factors involved can be used to define the segment S. If desired, it can be arranged that the angles α and β are equally-spaced to either side of the position O, but because it is likely that the directional device 70a will extend gradually (and in particular more slowly than it will retract) it may be preferable that the angle β is closer to the position O than is the angle α.

Of course, the steering apparatus 50 as disclosed herein has the additional directional devices 70b-c arranged at different angular orientations about the housing's circumference. Extension and retraction of these additional directional devices 70b-c can be comparably controlled in conjunction with what has been discussed above with reference to FIGS. 3A-3B so that the control system (60) can coordinate multiple retractions and extensions of the serval directional devices 70a-c during each of (or one or more of) the rotations R. Thus, the displacement of the housing 51 and directional devices 70a-c can be timed with the rotation R of the drillstring (22) and the apparatus 50 based on the orientation of the steering apparatus 50 in the advancing borehole. The displacement can ultimately be timed to direct the drill bit (40) in a desired drilling direction D and can be performed with each rotation or any subset of the rotations.

As noted previously, the steering apparatus 50 uses a reference to the apparatus' angular position while drilling so the steering apparatus 50 can steer the advancing borehole in the correct direction. Because the steering apparatus 50 rotates in the advancing borehole and experiences a number of disturbances in the process, the rotational speed of the apparatus 50 can vary significantly over the course of several and even a single rotation. For example, stick-slip is one type of disturbance that can occur in the rotational speed of the steering apparatus 50. Stick-slip of the bottom hole assembly can produce inaccuracies that cause significant difficulties in controlling the trajectory of the borehole. Therefore, accurate angular position of the steering apparatus 50 in high resolution is beneficial to system performance, allowing the steering apparatus 50 to better compensate for downhole dynamics. To that end, features of the disclosed steering apparatus 50, control system 60, control techniques, and the like are directed to addressing these problems.

To do this, the control system 60 seeks to accurately control the actuators (72) for the directional devices (70a-c) under various downhole disturbances, such as stick-slip conditions. Additionally, the control system 60 seeks to be self-calibrating during operations so that a build-up of inaccuracies can be avoided.

Figure 4A:
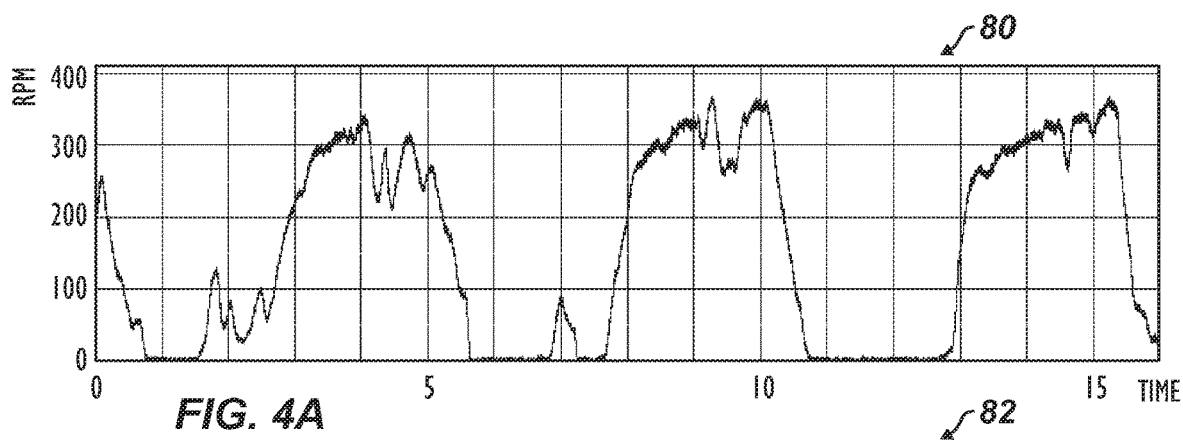
FIGS. 4A-4B plot examples of stick slip under consideration according to the present disclosure.
Figure 4B:
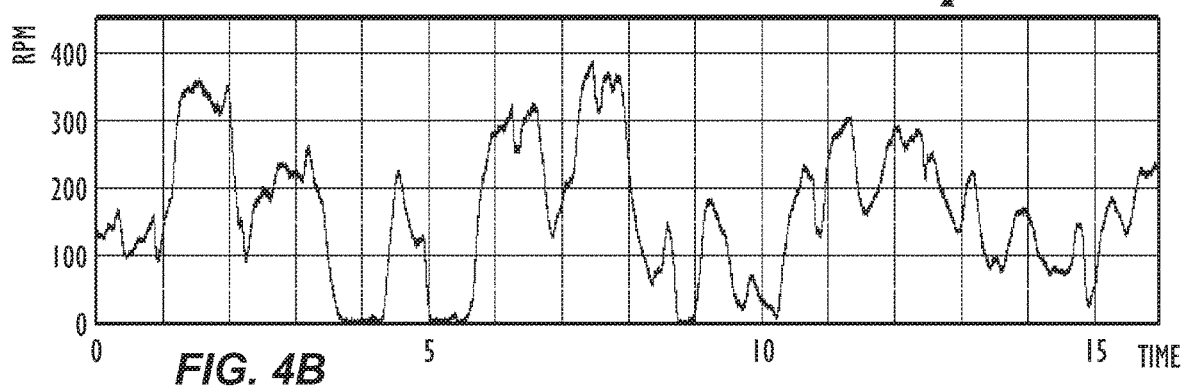

Before turning to particulars of the control system 60, discussion first turns to details related to the various downhole disturbances, such as stick-slip conditions and the like, under consideration. In particular, FIGS. 4A-4B plot examples of stick slip under consideration according to the present disclosure. These plots 80 and 82 are merely explanatory.

As shown first in the plot 80 of FIG. 4A, stick-slip can cause the rotational speed (RPM) of a bottom hole assembly having the disclosed steering apparatus (50) to oscillate from stick conditions (about 0 RPMs) to slip conditions (elevated RPMs), when the torsion built-up in the drill string during the stick condition releases and the RPM of the bottom hole assembly well exceeds the average RPMs being imparted to the bottom hole assembly for the drilling conditions. As shown, the RPMs can reach above 300 RPM in the slip conditions, and the stick slip oscillations can be cyclical in a more or less uniform fashion when the bottom hole assembly tends to engage roughly the same side of the borehole. Of course, this is not always the case. For example, FIG. 4B shows the plot 82 of a stick slip condition that is more complex in character.

As will be appreciated by one skilled in the art, the slip conditions of increased RPM can exceed the resolution of sensing capabilities in a given control system to an extent that the given control system incorrectly determines angular orientation. This in turn would lead to incorrect actuation of the apparatus so that the direction of the advancing borehole would be incorrect. For this reason, the disclosed steering apparatus 50 has control and sensing capabilities to at least better handle disturbances, such as forms of stick-slip discussed herein.

Figure 5A:
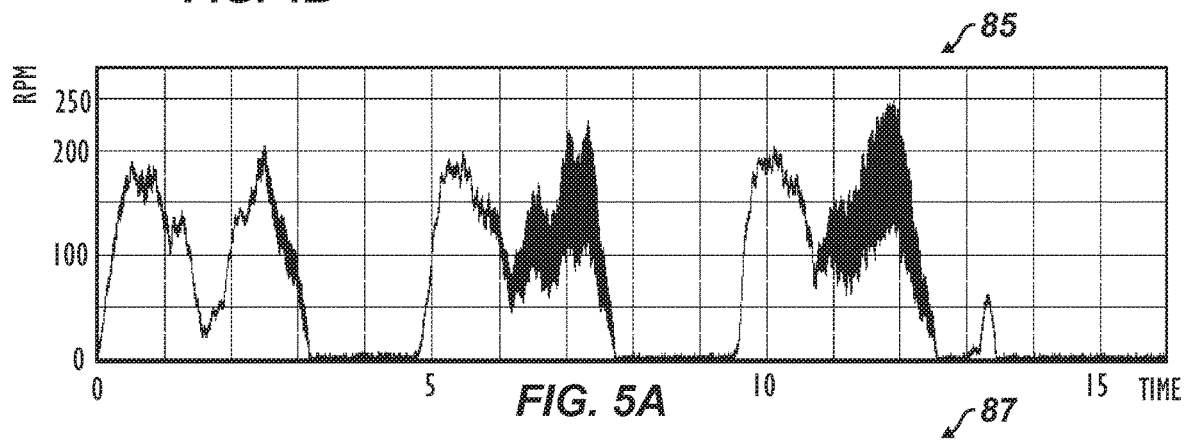
FIGS. 5A-5B plot examples of high frequency torsional oscillation under consideration according to the present disclosure.
Figure 5B:
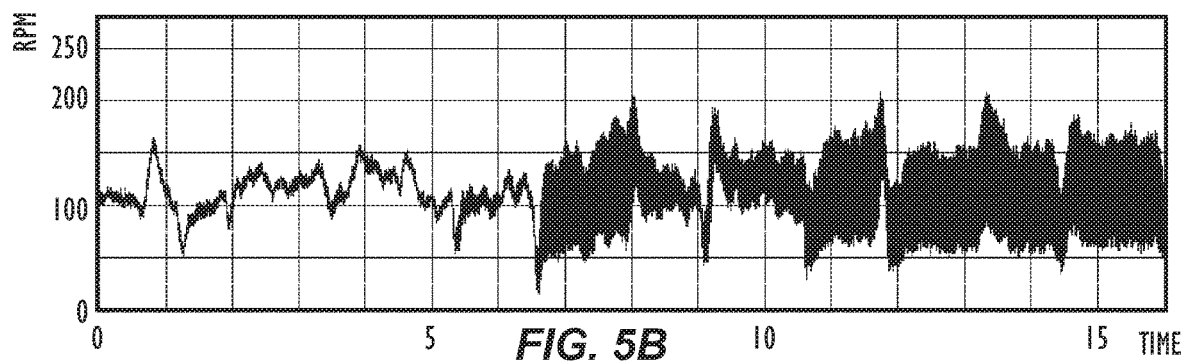

In addition to stick-slip, high frequency torsional oscillation can be another downhole disturbance under consideration according to the present disclosure. FIGS. 5A-5B plot examples of these types of oscillations. Again, these plots 85 and 87 are merely explanatory. As shown first in the plot 85 of FIG. 5A, the RPMs of a bottom hole assembly can oscillate at a high frequency over a short period of time between lower and upper RPM values. For instance, one set of oscillations changes rapidly in a short time period between about 50-RPM to about 225-RPM. A later oscillation changes rapidly in another short time period between about 75-RPM to about 250-RPM. Rather than being discrete in time as in FIG. 5A, the high frequency torsional oscillations can extend over longer periods of time, such as shown in the plot 87 of FIG. 5B.

Again, as will be appreciated by one skilled in the art, the high frequency oscillations of RPM can exceed the resolution of sensing capabilities in a given control system to an extent that the given control system incorrectly determines angular orientation. This in turn would lead to incorrect actuation of the apparatus so that the direction of the advancing borehole would be incorrect. Again for this reason, the disclosed steering apparatus 50 has control and sensing capabilities to at least better handle disturbances, such as forms of high frequency torsional oscillation discussed herein.

To achieve accurate control, for example, the control system 60 preferably includes accurate sensors and sensing capabilities. In particular, the control system 60 preferably includes an angular rate gyroscope sensor (ARG) with a scaled output range between ±2000°/Sec and ±5000°/Sec. Moreover, the control system 60 preferably includes an angular position sensor (APS) having magnetic detectors orthogonally oriented at two-axes and capable of detecting the earth's magnetic field.

The various sensors of the control system 60 have sources of error that the control system 60 preferably accounts for to improve accuracy. For example, the angular position sensor (APS) of the control system 60 has sources of error that include bias, scale, and misalignment. To improve sensing by the angular position sensor, the bias of the sensor can be determined as an average, and compensations based on the average bias can be applied to the angular position readings. Misalignment of how the angular position sensor is installed in the apparatus 50 can be initially determined and similarly accounted for. The scale of angular position sensor (APS) is preferably corrected so that the X and Y readings are scaled for relative comparison to one another.

Because sensing of the tool face has similar errors that include bias, scale, and misalignments, similar accommodations can be made for sensing of the tool face with the control system 60.

The Angular Rate Gyroscope (ARG) of the control system 60 has somewhat different sources of error that include bias and sample period jitter. As before, the bias of the Angular Rate Gyroscope (ARG) is preferably accounted for in adjusting the angular rate readings. The sample period jitter of the Angular Rate Gyroscope (ARG) can be known and applied to readings as needed.

Figure 8:
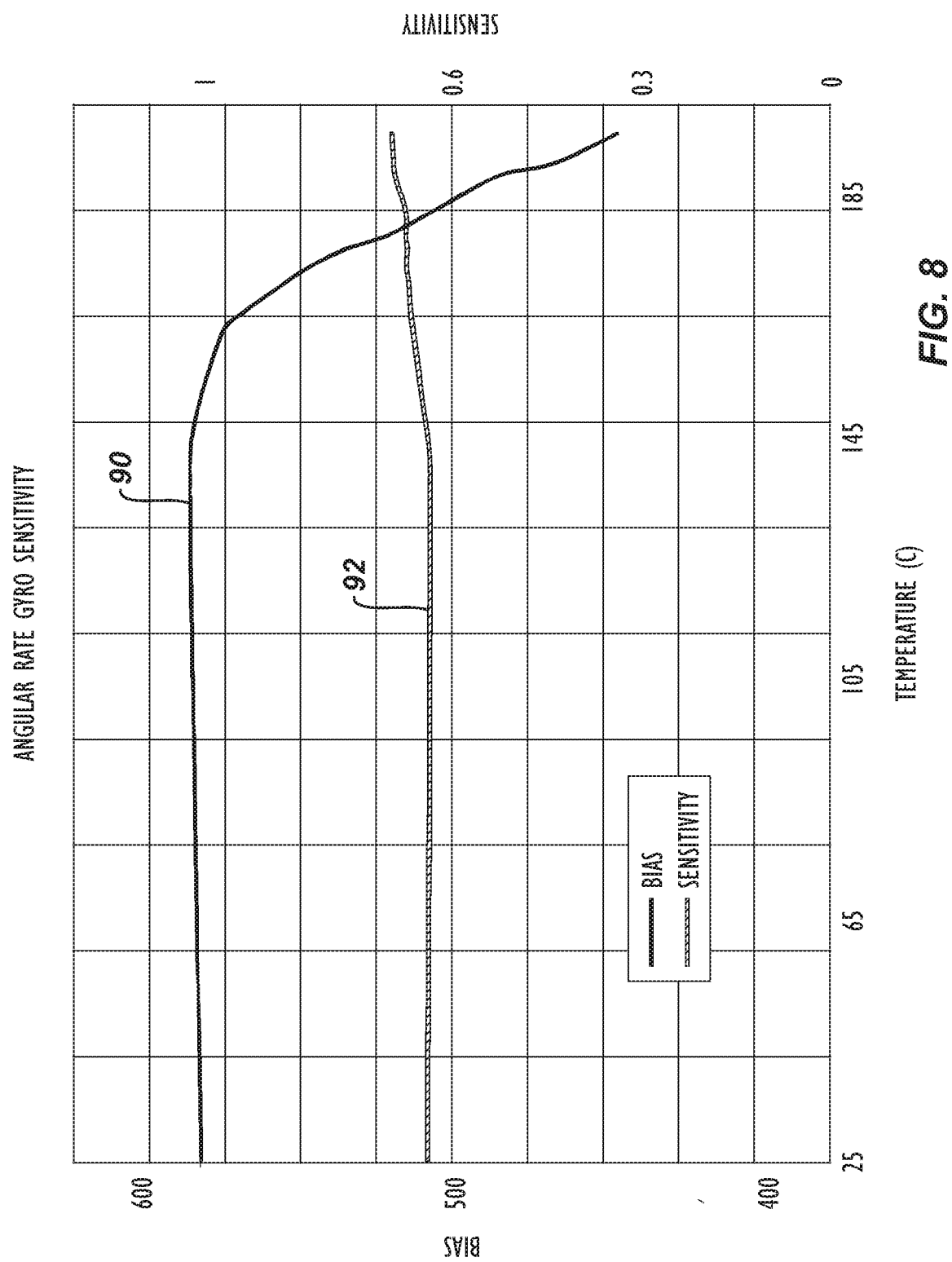
FIG. 8 plots bias and sensitivity of an angular rate sensor relative to temperature.

As a brief example, FIG. 8 plots bias 90 and sensitivity 92 determined experimentally for an angular rate sensor (ARG) relative to temperature. In this particular example, the bias 90 of the angular rate sensor remains relative steady from 25 C to about 145 C, but then drops sharply. Sensitivity 92 of the angular rate sensor also remains relative steady from 25 C to about 145 C, and only rises slowly thereafter. The control system 60 for the disclosed apparatus 50 can account for such bias 90 and sensitivity 92 relative to temperature, as in affects sensors such as the angular rate sensor, to improve operation of the system 60 during drilling.

Due to such sources of error, the control system 60 preferably performs self-calibration during operations. The form of calibrations at least include angular position and angular rate calibrations. In the angular position calibration discussed in more detail below, for example, the mechanical misalignment of X-Y magnetometers of the control system 60 is applied to magnetometer readings. Also, corrections for the X-Y rotating biases and the X-Y rotating scales are applied to the magnetometer readings.

In the angular rate calibrations discussed in more detail below, for example, the bias of an angular rate sensor of the control system 60 is determined when pumps (26) are off and the drillstring (22) is not rotating during drillpipe connections. The angular rate readings obtained during rotations are then corrected for that bias, and any rotating scale of the readings can be corrected.

Figure 6:
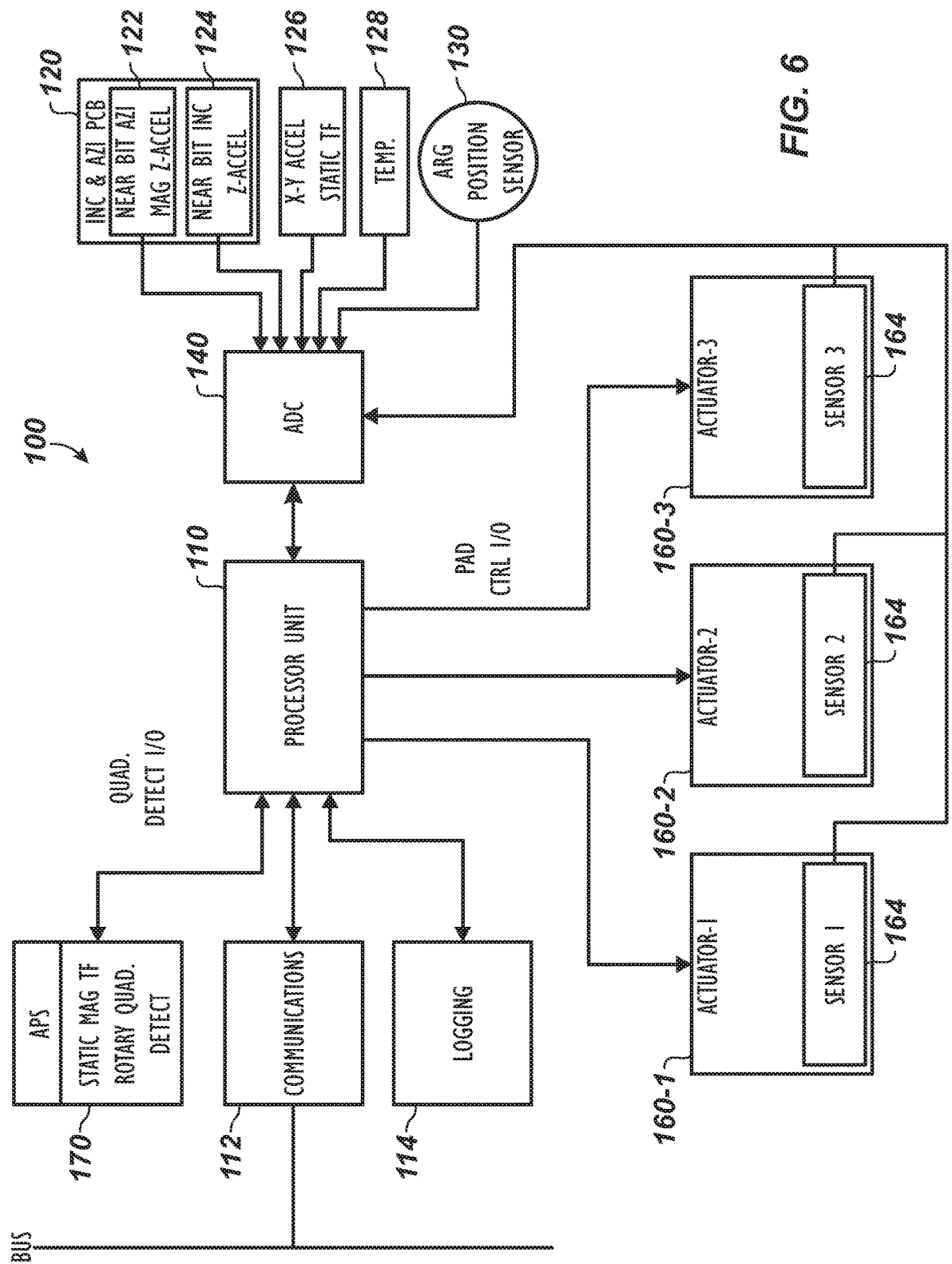
FIG. 6 illustrates a schematic of a control system for the disclosed steering apparatus.

With an understanding of the various downhole disturbances, sensing capabilities, errors, sensitivities, and the like under consideration in controlling the disclosed apparatus 50, discussion now turns to some particular details of a control system for the disclosed apparatus 50. In particular, FIG. 6 illustrates a schematic of a control system 100 for the disclosed steering apparatus 50. The control system 100 as depicted here can combine or can be part of one or more previously disclosed elements, such as the control assembly 30, control system 60, etc., which are consolidated in the description here. Separate reference to some of these components may have been made previously in the disclosure for the sake of simplicity.

The control system 100 includes a processing unit 110 having processor(s), memory, etc. Sensor elements or "sensors" 120, 130, and 170 interface with the processing unit 110 and may use one or more analog-to-digital converters 140 to do so. In general, the control system 100 uses an angular rate gyroscope to determine an angular rate of the apparatus 50, and readings from a magnetometer give a highside of the apparatus 50 for orientation of the apparatus 50 relative to the borehole. For example, various sensor elements can include inclinometers, magnetometers, accelerometers, and other sensors that provide position information to the processing unit 110.

In particular, an inclinometer and azimuthal sensor element 120 can include a near-bit azimuthal sensor 122 and a near-bit inclinometer sensor 124, which may use magnetometers and Z-axis accelerometers. A static toolface sensor 126 can provide the toolface of the apparatus (50) and can have X and Y axes accelerometers. A temperature sensor 128 can provide temperature readings. Finally, an angular rate gyroscope (ARG) sensor 130 can provide the angular rate of the apparatus (50) during operation for obtaining position readings.

The processing unit 110 also communicates with an angular position sensor (APS) 170, which provides static magnetic toolface and detects the rotary quadrant of the apparatus (50) during operation. The processing unit 110 can communicate with other components of the apparatus (50) via communication circuitry 112 and a bus and can store information in logging memory 114. Finally, the processing unit 110 interfaces with multiple actuator modules 160-1, 160-2, 160-3 of the apparatus (50), which are used to actuate the various directional devices as noted herein.

The actuator modules 160-1, 160-2, 160-3 may use sensors 164 to monitor the operation (e.g., state, position, etc.) of the actuators using feedback to the processing unit 110. For example, the sensors 164 can be pressure transducers used to determine the actuators' operations in the first instance. The pressure transducers can also provide pressure readings that can also help determine wear and to verify overall operation.

During operation, the control system 100 operates based on discrete position information obtained with the various sensor elements 122, 124, 126, 130, 170, etc. The resolution of the position information can be 0.5 ms @ 300 rpm, which would can give an angular resolution of about 0.9° for the apparatus' rotation. Additionally, the angular rate gyroscope sensor 130 is used in conjunction with X-Y crossovers from the APS 170 to obtain position information at about 3-kHz. The X-Y accelerometers obtain an offset value of static gravity to magnetic highside for determining toolface of the apparatus (50).

Using a control process discussed below, the processing unit 110 processes the input of the various sensor readings and can monitor the operation (e.g., state, position, etc.) of the actuators using feedback from the modules' sensors 164. In turn, the processing unit 110 provides actuator control signals to the actuator modules 160-1, 160-2, and 160-3 to steer the apparatus (50).

Figure 7:
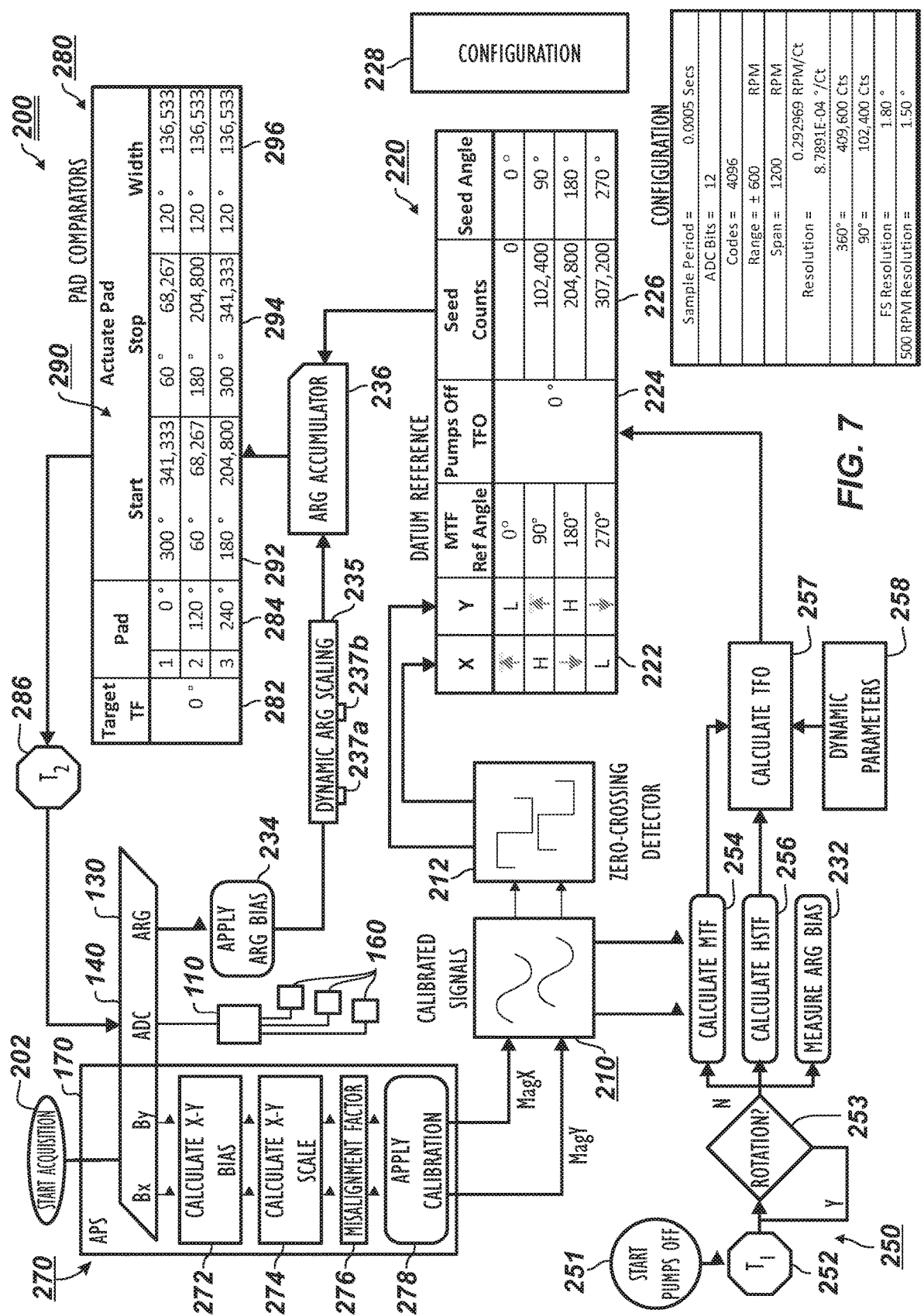
FIG. 7 illustrates a flow diagram of the control techniques for the disclosed steering apparatus.

FIG. 7 illustrates a flow diagram of a control process 200 used by the control system 100 as in FIG. 6 of the disclosed steering apparatus 50. Overall, starting at acquisition 202, the control process 200 combines the operation of the angular position sensor (170), the angular rate sensor (130), and an analog-to-digital converter (140) together to develop director actuations 290 for the actuator modules (160) based on a target toolface 282. The angular position sensor (170) obtains measurements and is calibrated during rotation in a measurement and calibration process 270 to produce calibrated magnetometer readings 210.

A toolface offset (TFO) 257 between a magnetic toolface (MTF) 254 and a highside toolface (HSTF) 256 of the apparatus (50) is determined periodically in an offset calculation process 250. The bias 232 of the angular rate sensor (130) is also measured periodically so that the bias correction 234 can be applied to the readings from the angular rate sensor (130).

Finally, the calibrated magnetometer readings 210 and the calculated toolface offset (TFO) 257 are combined in a datum reference calculation 220 that is used to re-datum the accumulation of readings from the angular rate sensor (130). In general, the magnetometer(s) for the angular position sensor(s) (170) are used to re-sync the angular rate sensor (ARG) (130) at least one zero crossing point. All position based control and/or measurements are based upon the calibrated angle provided by the angular rate sensor 130. Ultimately, the accumulated angular rate readings in an accumulator 236 are used to determine director actuation calculations 280 based on the target toolface 282 so that the counts of the analog-to-digital converter (140) can be properly sampled and the processing unit (110) can operate the actuator modules (160) of the apparatus (50).

According to the present disclosure, the angular position measurement steps 270 may not strictly require "calibrated" magnetometers or accelerometers to function. Typically, an ArcTan of the measurements from the sensors would be used to compute instantaneous toolface. As such, the magnitudes of the measurements involved in the typical arrangement would be important. However, the process 200 of the present disclosure instead uses zero-crossings (see zero-crossing detector 212). Therefore, the magnitudes of the magnetometer and accelerometer waveforms are of less importance as long as a sufficient signal-to-noise ratio exists for zero-crossing events to be detected. (As an aside, bias and misalignment may still need to be applied to get accurate zero-crossings at the cross points (i.e., 90° points). If the magnetometer misalignment varies between sensors, then this may need calibration input. That being said, the misalignment could be calculated dynamically.) In the end, an integrated angular rate obtained from the calibrated angular rate gyroscope sensor 130 fills in the positional information between the zero-crossings 212 to deliver a high-resolution hybrid angular position system.

Looking first at the measurement and calibration process 270, the angular position sensor (170) obtains magnetometer readings Bx-By. To account for errors due to bias and scale with the angular position sensor (170), calculations of the X-Y bias 272 and X-Y scale 274 are made, and a misalignment factor 276 is also applied so that a calibration 278 can be applied. As will be appreciated, the angular position sensor (170) accumulates rolling errors during rotation so that the errors are corrected in the process 270. In correction 272, for instance, average bias in both X and Y directions is calculated as the apparatus (50) rotates, and the X-Y magnetometer readings of the angular position sensor (170) are corrected for that average bias. In correction 274, the higher amplitude of the magnetometer reading in X or Y directions is used to scale the lower amplitude reading so that the X-Y magnetometer readings of the angular position sensor (170) are corrected for scale. In correction 276, the misalignment is essentially a constant offset value based on how the X-Y magnetometer of the angular position sensor (170) is installed in the apparatus (50). With the corrections applied in step 278, calibrated X-Y magnetometer readings 210 are produced.

The calibrated magnetometer readings 210 are fed into a detector 212 to determine states in X-Y for the datum reference process 220. Here, four zero-crossing states are determined per each revolution using a zero-crossing detector that finds when the sine and cosine signals of the X-Y magnetometer readings cross zero, which may simply lend itself to ready detection. However, any other number of states can be determined for any partial revolution or any group of revolutions. For example, the number of states can be matched to the number of detector actuators of the apparatus (50) to simplify later calculations.

Although the angular position sensor (170) may have more than one magnetometer component used to re-sync the angular rate sensor (ARG) measurement, the system (100) can use a single magnetometer component to re-sync the angular rate sensor (ARG) measurements at zero crossing points. Additionally, use of one magnetometer component for the angular position sensor (170) may not require a misalignment calibration. However, using a single magnetometer component may require a bias calibration to insure that the zero crossings (re-sync points) are properly spaced (e.g., 180° apart). Yet, if only one zero-crossing per rotation is used for the angular rate sensors' re-sync angle, the bias calibration may not need to be particularly accurate. At most, the system (100) may only need to ensure that the magnetometer measurement crosses zero twice per revolution.

The calibrated magnetometer readings 210 are also fed into the offset calculation process 250. As noted above, this process 250 is determined periodically when the pumps are off and the apparatus (50) is not rotating, such as when a drill pipe connection is being made at the surface. Here, the process 250 starts after an initial time (T1) 252 of the pumps being off 251. Rotation 253 of the apparatus (50) is checked. If the apparatus (50) is not rotating, then the process 250 calculates the magnetic toolface (MTF) 254 using the calibrated magnetometer readings 210. Because the magnetometer is not rotating, any previous X-Y bias, X-Y scale, and the like determined for the angular position sensor (270) is stored in memory and applied to the calculation of the magnetic toolface (MTF) 254.

The process 250 also calculates the highside toolface (HSTF) 256 using static toolface measurements from accelerometers or the like. These two toolface readings MTF 254 and HSTF 256 are then used to calculate the toolface offset 257, which is used to orient the dynamic X-Y magnetometer readings to a static reference position. The calculated toolface offset (TFO) 257 is then fed into the datum reference process 220 as an adjustment toolface offset 224 to the dynamic X-Y magnetometer readings for the magnetic toolface from the angular position sensor (170) during revolutions.

In some instances, this toolface offset (TFO) 257 of the magnetic toolface 254 relative to the highside toolface 256 can be a relatively constant value of the drilling distance of one stand of drill pipe. In other instances, the toolface offset (TFO) 257 can vary as much as 15-degrees because the offset 257 may generally depend on the inclination and azimuth of the apparatus (50) while drilling. Accordingly, the calculation of the toolface offset (TFO) 257 may be adjusted by dynamic parameters 258, which may be in the form of constant values, variables, and equations based on the inclination and azimuth of the apparatus (50) while drilling.

While the pumps are off and the apparatus (50) is not rotating during the process 250, the bias 232 of the angular rate sensor (130) is also measured. In general, the measured bias 234 is a relatively stable value so that evaluating the bias at each drillpipe connection may be sufficient.

Alternatively, the angular rate reading bias 232 can be at least periodically measured when the apparatus (50) is rotating in the borehole. To do this, the process finds two periods in which average rotation rates are different. The angular rate gyroscope (ARG) counts and the RPM delta between these two periods can then be used to calculate a form a scale factor of raw counts per RPM. In other words, from these two period, a ratio is calculated of a count of the angular rate readings relative to a difference in the rotation rates. The angular rate reading bias can then be determined by linearly extrapolating the ratio for either of these two periods to a point of no rotation (i.e., 0 RPM), which will indicate the bias. (As an aside, it may be noted that this method of calculating bias while rotating requires that the two rotation rates be known so that the zero rotation rate (aka bias) can be linearly extrapolated.) In the end, the requirement to generate each of the two period is similar to the process used to generate a scale factor discussed herein in which an accumulator is used for ARG counts and an accumulator is used for APS position (see e.g., accumulators 237a-b).

Ultimately, during acquisition of the angular rate sensor (130), the measured bias 234 is applied to the angular rate readings from the angular rate sensor (130). The angular rate readings from the angular rate sensor (130) may also go through a dynamic scaling process 235. As disclosed herein with reference to FIG. 8, for example, the sensitivity of the angular rate sensor (130) is reduced at the higher temperatures. A dynamic scale factor can be used to extend the operating range of the angular rate sensor (130) and provide for more accurate measurements. This scaling may be done for one or more revolutions based on the zero crossings as sync points.

Essentially, the process 235 calibrates the readings of the angular rate sensor (130) with the readings of the angular position sensor (170). In particular, the process 235 determines a dynamic scale factor to apply to the angular rate measure by using two accumulators 237a-b and mathematical calculation. A first accumulator 237a is used to track the total number of degrees that the angular position sensor (170) has moved (i.e., "Total Degrees APS"). An additional accumulator 237b is used to track the total number of counts from the analog-to-digital converter 140 have been gathered from the angular rate sensor (130) (i.e., "Total ARG ADC Counts"). Both accumulators 237a-b sum over the same period.

Periodically (e.g., based upon degrees traversed), the ARG scale factor is calculated by dividing the "Total Degrees APS" 237a by the "Total ARG ADC Counts" 237b. This newly calculated ARG scale factor (degrees per ARG ADC count) can then be used to compensate the ADC counts of angular rate sensor (130) until a subsequent scale factor is ready. As will be appreciated, the dynamic ARG scale factor will be more accurate when a larger the number of degrees are traveled for the accumulation and calculation. Notably, the scaling process 235 is not sensitive to stick-slip conditions.

During drilling as the apparatus (50) rotates, the angular rate readings from the angular rate sensor (130) are accumulated in an accumulator 236. As will be appreciated, any error in the resolution of the angular rate readings can build significantly over time so that any directional steering controls will be in error. Accordingly, the datum reference process 220 uses the calibrated magnetometer readings 210 and the calculated adjustment toolface offset 224 to calculate seed counts 226 of the acquisition for seed angles in the apparatus's rotation. The calculation of the seed counts 226 is based on a stored configuration 228 for the apparatus (50).

The stored configuration 220 can be preset and can be different as needed for a given implementation. In general, the configuration 228 sets a particular sample period for measurement, dictates the number of bits for ADC, provides a range and span of RPMs, gives a measurement resolution of RPM relative to count (i.e., degrees of rotation). Example information for one such configuration 228 is depicted here.

Using the configuration 228, the magnetic toolface states 222 in X-Y, and the adjustment toolface offset 224, the datum reference process 220 calculates the seed counts 226 for the various MTF or seed angles, such as 0, 90, 180, 270-degrees.

The seed counts 226 are then used in processing (i.e., adjusting, re-orienting, etc.) the accumulated angular rate readings in the accumulator 236 for the director actuations 290 at particular seed counts (i.e., angles). In this way, the angular rate readings can be seeded in the actuation calculation process 280 for the given target toolface 282 to advance the borehole in the desired direction.

As shown here, the apparatus (50) in this example has three actuator modules 160 (i.e., actuators, directors, etc.), although the apparatus (50) may in general having one or more actuators. In this example, the actuators for the modules (160) are arranged uniformly at every 120-degrees about the circumference of the apparatus (50), but any arrangement could be used. In the director actuations 290, the target toolface 282 (in degrees) is divided into the geometrical arrangement of the actuators on the apparatus (50) (i.e., three pistons arranged symmetrically about the apparatus' circumference at 120-degress from one another). Start 292 of the actuation (shown in degrees/speed counts), stop 294 of the actuation (shown in degrees/speed counts), and width 296 of the actuation (shown in degrees/speed counts) are determined for each of the pads 284 of the actuator module (160) so as to move the apparatus (50) toward the target toolface 282. These actuations 292, 294 are fed to the analog to digital converter 140 in time (T2) 286 so the processing unit (110) can operate the actuator modules (160) accordingly. As will be appreciated, the target toolface 282 is provided to the processing unit (110) as part of the drilling operations and may be dictated from control signals in memory, from telemetry, from on-board sensing and calculation, etc.

Although discussed for steering during directional drilling as disclosed above, teachings of the present disclosure can be used in other implementations, such as in measurement-while-drilling (MWD) or logging-while-drilling (LWD) implementations. For instance, the teachings of the present disclosure can be used when measuring/logging with at least one sensor on an apparatus in a borehole, either in addition to or instead of the directional drilling disclosed here.

As briefly shown in FIG. 1, for example, the sensor section 32 of the downhole assembly 20 can have any type of sensors used in Measurement-While-Drilling (MWD) and Logging-While-Drilling (LWD) operations including, but not limited to, sensors responsive to gamma radiation, neutron radiation, and electromagnetic fields. In this technique, at least one sensor 33 in the sensor section 32 advances in the borehole 12 while rotation is imparted to the assembly 20. Consequently, the at least one sensor 33 senses measurements while rotation is imparted to the assembly 20 advancing in the borehole 12.

According to the present technique, angular rate readings are obtained of the rotation of the assembly 20, and angular position readings are obtained of the assembly 20 during the rotation. The present technique then adjusts the angular rate readings based at least on the angular position readings to determine angular positions of the assembly 20 in the manner disclosed herein.

In this way, one or more the measurements of the at least one sensor 33 sensing during the rotation can be correlated to the determined angular positions. In turn, an image can be generated using known imaging method from the one or more correlated measurements. The results can give high resolution angular position measurements that can improve the quality of log images, wellbore surveys, and the like. Also, the correlation can allow for targeted sensing by the at least one sensor 33 of the sensing section 32. For instance, the one or more measurements sensed with the at least one sensor 33 at one or more sensed directions during the rotation can be correlated to one or more targeted directions of the determined angular positions. The result is that the at least one sensor 33 can sense towards (or be correlated to) the one or more targeted directions based on the determined angular positions.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the disclosed subject matter. Therefore, it is intended that the disclosed subject matter include all modifications and alterations to the full extent that they come within the scope of the disclosed embodiments or the equivalents thereof.

What is claimed is:

1. A method for use with an apparatus in a borehole, the apparatus having at least one element disposed thereon, the method comprising:
imparting rotation to the apparatus in the borehole about an axis of the apparatus, the at least one element rotating with the apparatus about the axis during the rotation;
obtaining angular rate readings of the rotation of the apparatus about the axis;
obtaining angular position readings of the apparatus about the axis during the rotation;
determining angular positions of the apparatus about the axis by adjusting the angular rate readings based at least on the angular position readings; and
correlating locations of the at least one element in the borehole to the determined angular positions about the axis during the rotation.

2. The method of claim 1, the at least one element comprising at least one measurement sensor disposed on the apparatus, wherein the method further comprises sensing measurements with the at least one measurement sensor while the rotation about the axis is imparted to the apparatus; and wherein correlating the locations of the at least one element in the borehole to the determined angular positions about the axis during the rotation comprises correlating the locations of the measurements of the at least one measurement sensor in the borehole to the determined angular positions about the axis during the rotation.

3. The method of claim 2, further comprising generating an image of the correlated measurements sensed by the at least one measurement sensor.

4. The method of claim 1, the at least one element comprising at least one actuator on the apparatus, wherein correlating the locations of the at least one element to the determined angular positions about the axis during the rotation comprises steering the apparatus in advancing the borehole towards a target direction by determining, from the correlated locations of the at least one actuator, actuations of the at least one actuator relative to the target direction and actuating the at least one actuator during the rotation based on the determined actuations.

5. A method of drilling a borehole with an apparatus having at least one actuator disposed thereon, the method comprising:
   advancing the borehole by imparting rotation to the apparatus about an axis;
   obtaining angular rate readings of the rotation of the apparatus about the axis;
   obtaining angular position readings of the apparatus during the rotation; and
   steering the apparatus in the advancing borehole towards a target direction by:
      determining angular positions of the apparatus about the axis by adjusting the angular rate readings based at least on the angular position readings; and
      directing the apparatus towards the target direction by actuating the at least one actuator during the rotation relative to the determined angular positions.

6. The method of claim 5, wherein obtaining the angular rate readings comprises obtaining the angular rate readings using an angular rate gyroscope disposed on the apparatus; and wherein obtaining the angular position readings comprises obtaining the angular position readings using magnetometers disposed on the apparatus and oriented orthogonally in two-axes.

7. The method of claim 5, further comprising:
   obtaining at least periodically toolface offset readings of the apparatus in the borehole when not rotating; and
   correcting the angular position readings of the apparatus relative to the at least periodically obtained toolface offset readings,
   wherein adjusting the angular rate readings comprises adjusting the angular rate readings based at least on the angular position readings corrected relative to the at least periodically obtained toolface offset readings.

8. The method of claim 7, wherein obtaining at least periodically the toolface offset readings of the apparatus in the borehole when not rotating comprises:
   determining that the apparatus is not rotating;
   determining a magnetic toolface of the apparatus when not rotating;
   determining a highside toolface of the apparatus when not rotating; and
   calculating the toolface offset from the determined magnetic toolface and highside tool face.

9. The method of claim 8, wherein determining the magnetic toolface comprises obtaining X-Y magnetometer readings; and wherein determining the highside tool face comprises obtaining accelerometer readings.

10. The method of claim 8, further comprising adjusting the calculated toolface offset by at least one dynamic parameter based on information of inclination and azimuth of the apparatus.

11. The method of claim 5, wherein obtaining the angular position readings of the apparatus during the rotation comprises calculating, for each of one or more states of the angular position readings in one or more orthogonal axes, a resolved angular orientation corrected by a toolface offset.

12. The method of claim 11, wherein the one or more orthogonal axes comprises X-Y directions; and wherein calculating comprises detecting zero-crossings for the X-Y directions of the angular position readings at four of the states in each of the X-Y directions.

13. The method of claim 12, wherein adjusting the angular rate readings based at least on the angular position readings comprises adjusting the angular rate readings accumulated over time by the resolved angular orientations.

14. The method of claim 5, further comprising:
   measuring angular rate reading bias at least periodically; and
   adjusting the angular rate readings obtained during the rotation by the at least periodically measured bias.

15. The method of claim 14,
   wherein measuring the angular rate reading bias at least periodically comprises measuring the angular rate reading bias at least periodically when the apparatus is rotating in the borehole; and
   wherein adjusting the angular rate readings obtained during the rotation by the at least periodically measured bias comprises:
      finding at least two periods in which average rotation rates are different;
      calculating, from the at least two periods, a ratio of a count of the angular rate readings relative to a difference in the rotation rates; and
      determining the angular rate reading bias by linearly extrapolating the ratio for at least one of the periods to a point of no rotation.

16. The method of claim 5, further comprising calibrating the angular position readings obtained during the rotation based on at least one of: sensor bias, scale of first of the readings with respect to a first axis relative to second of the readings with respect to a second axis, a misalignment of the first and second axes relative the apparatus; and temperature effects based on a scale factor determined dynamically from the obtained angular position readings.

17. The method of claim 5, wherein directing the apparatus towards the target direction by actuating the at least one actuator during the rotation relative to the determined angular positions comprises using a point-the-bit configuration or a push-the-bit configuration of the at least one actuator.

18. An apparatus used in a borehole, the apparatus comprising:
   at least one element disposed on the apparatus and rotating therewith about an axis of the apparatus during rotation in the borehole;
   a sensing element obtaining angular position readings during the rotation and obtaining angular rate readings of the rotation; and
   a control system in operable communication with the at least one element and the sensing element, the control system configured to:
      adjust the angular rate readings based at least on the angular position readings to determine angular positions of the apparatus about the axis; and
      correlate locations of the at least one element to the determined angular positions about the axis during the rotation.

19. The apparatus of claim 18, wherein the at least one element comprises at least one measurement sensor disposed on the apparatus and sensing measurements while the rotation about the axis is imparted to the apparatus; and wherein to correlate the locations of the at least one element to the determined angular positions about the axis during the rotation, the control system is configured to correlate the measurements of the at least one measurement sensor to the determined angular positions about the axis during the rotation.

20. The apparatus of claim 18, wherein the at least one element comprises at least one actuator disposed on the apparatus and being operable to steer the apparatus in advancing the borehole towards a target direction; and wherein to correlate the locations of the at least one element to the determined angular positions about the axis during the rotation, the control system is configured to:
   determine, from the correlated locations of the at least one actuator, actuations of the at least one actuator relative to the target direction, and
   actuate the at least one actuator during the rotation based on the determined actuations.

\* \* \* \* \*